Dec. 31, 1940.   K. SCHLESINGER   2,227,013
ELECTRON DISCHARGE DEVICE FOR TELEVISION TRANSMISSION AND LIKE PURPOSES
Filed Nov. 20, 1936   4 Sheets-Sheet 2

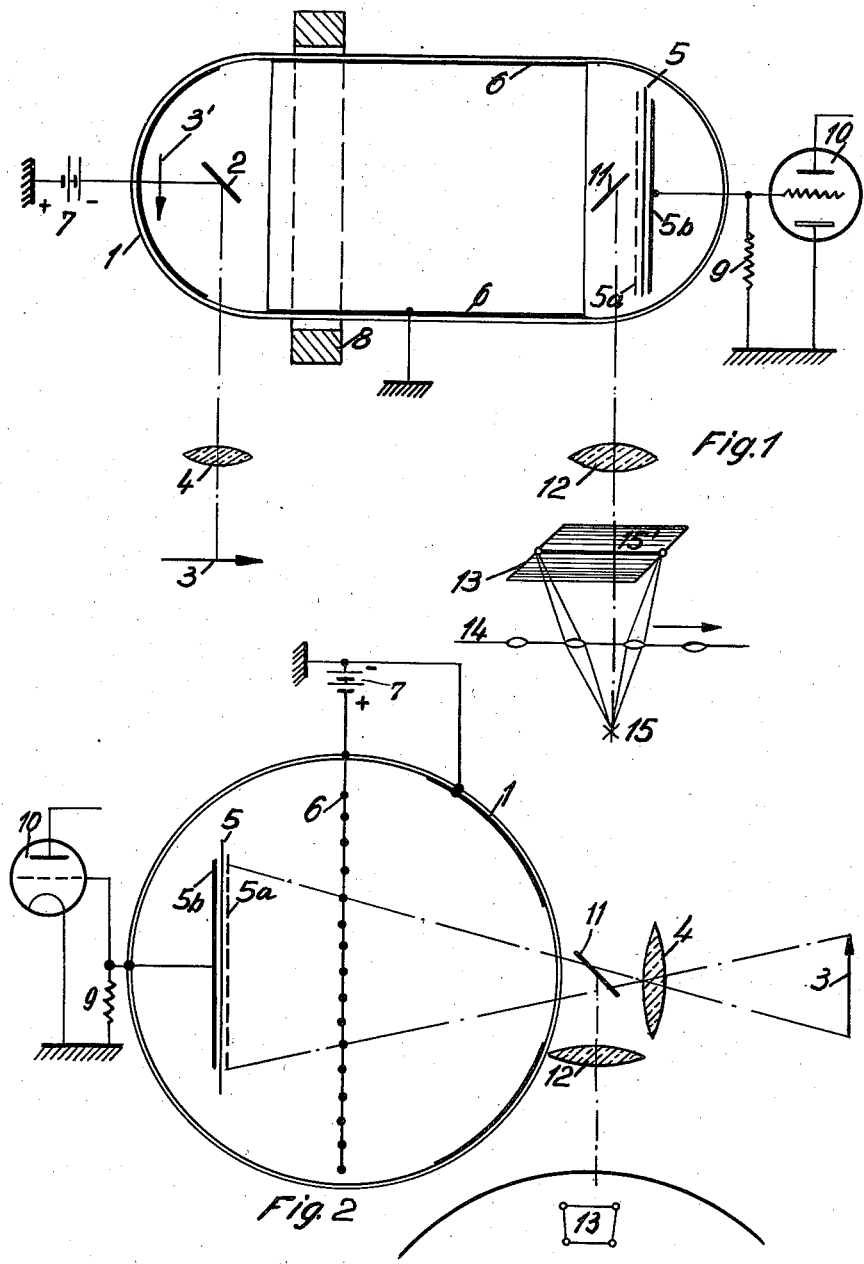

Inventor:

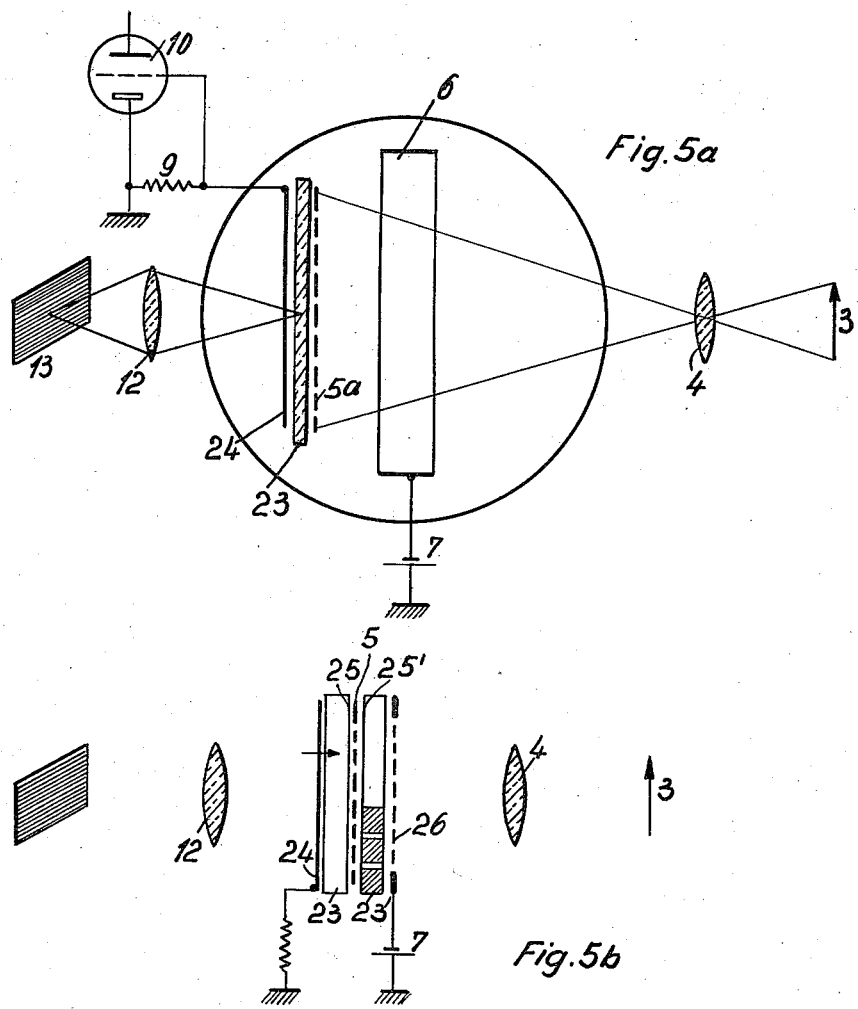

Patented Dec. 31, 1940

2,227,013

UNITED STATES PATENT OFFICE 2,227,013

ELECTRON DISCHARGE DEVICE FOR TELEVISION TRANSMISSION AND LIKE PURPOSES

Kurt Schlesinger, Berlin, Germany, assignor, by mesne assignments, to Loewe Radio, Inc., a corporation of New York Application November 20, 1936, Serial No. 111,815
In Germany November 22, 1935

11 Claims. (Cl. 178—7.2)

The present invention relates to an electron discharge device, which is adapted to supply to an amplifier associated therewith television modulation in correspondence with an image which is projected from an optical original on to a photo-electric mosaic screen provided in the tube. The tube according to the invention differs from the conventional storage electron camera tube arrangement by the fact that the scanning of the image is not effected by cathode ray but by a moving spot of light. The tube according to the invention has in common with the tube known under the registered trade-mark "Ikonoscope" and with all tubes having capacitatively loaded multi-cell screens the advantage of a sensitivity increased by storage.

The scanning of a photo-mosaic by means of a moving spot of light is already known. In the corresponding known arrangement, however, it is necessary to apply the photo-mosaic layer to a support, which allows the passage of current and which accordingly has no infinitely high resistance. The ensuing requirement of providing a constant, homogeneous and very high transverse resistance implies a serious difficulty in the practical execution.

The electronic tubes with optical scanning according to the invention avoid this disadvantage by having the mosaic particles disposed therein, without a semi-conductor, on a highly insulating support, for example mica, the re-adjustment of the original potential in between successive scans being performed by means of an external electronic source.

The invention will be better understood when reference is had to the accompanying drawings, wherein—

Fig. 1 shows a transmitting device having two photo-electric structures one of which is electron-optically reproduced onto the other one, whereas Figs. 2 and 3 show tubes according to the invention comprising but one photo-electric structure in combination with separate means for re-constituting the original condition of this photo-electric structure in between successive scans.

By Figs. 5a and 5b devices are indicated in which use is made of the phenomenon of photo-electric emission from barrier layers.

Figure 6:
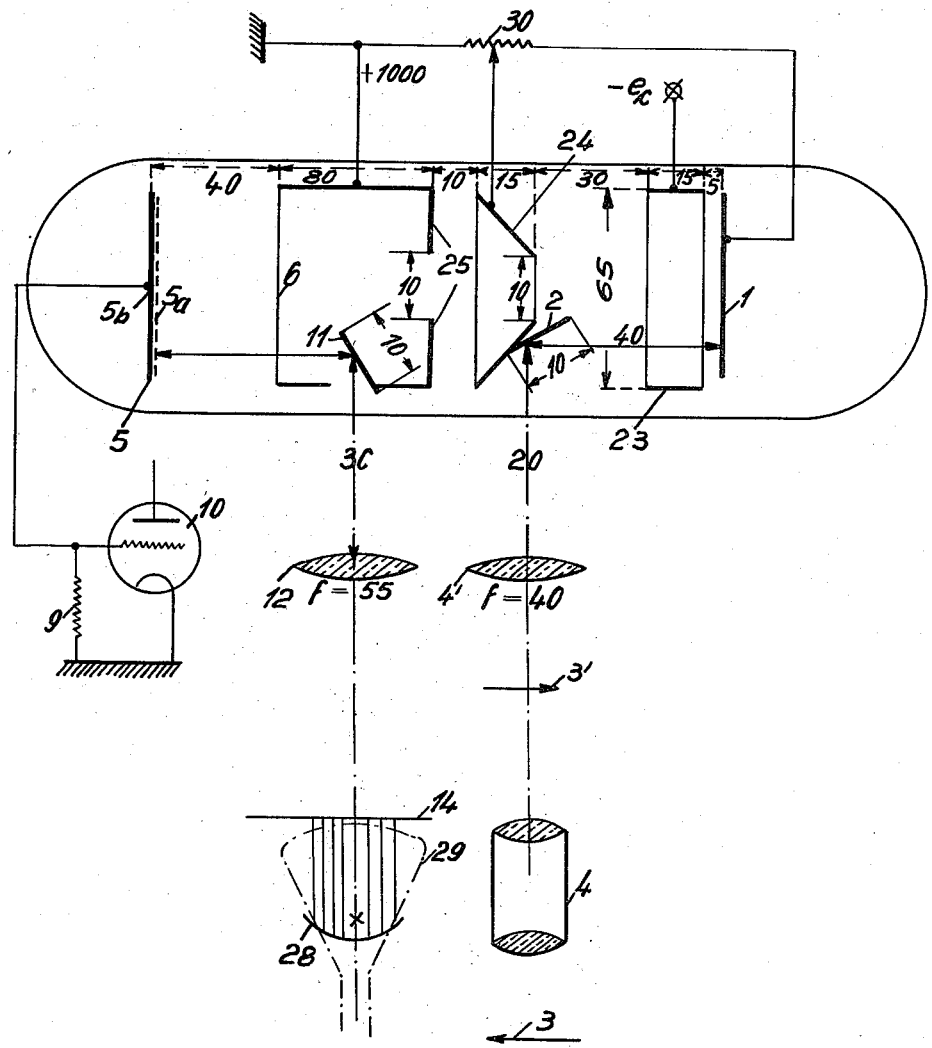

Fig. 6 shows a tube operated substantially on the same lines as the tube according to Fig. 1, the electro-magnetic electron-optical means being, however, replaced by electro-static means, and further structural details being given.

According to Fig. 1, a continuous photo-electric layer 1 has light from the original image 3 projected thereonto by way of an image producing lens 4 and, if desired, also by way of a small reversing mirror 2. In the manner which is already known in the case of the so-called "image converter" an electron image may be projected from the optical reproduction 3' of the original 3 on to a picture receiving plate 5. For this purpose the current of photo-electrons from 1 is accelerated by a wall coating 6 acting as an anode, with the photoelectric layer 1 being, by a battery 7, maintained negative to the extent of a few thousand volts in relation to the anode 6 by a battery 7. A magnet coil 8 produces a sharp electron image of 1 on the picture receiving plate 5. The picture receiving plate 5 comprises a mosaic 5a at the front and a conductive coupling plate 5b at the back, which is connected by way of a resistance 9 with ground and with the grid of an amplifier 10. The mosaic is scanned by a light ray in the following way. By means of a second deflecting mirror 11 and a reproducing lens 12 the optical reproduction of a raster area 13 is projected on to the mosaic 5a. The raster area 13 is obtained, by one of the numerous methods which have become known, as the location in space of real light image points. For example, a lens disc 14 may be caused to rotate in front of the plate 13 while it projects on to the plate the image 15' of a spot of light 15. The area 13, however, may also be the scanning area of a Nipkow disc, which is illuminated with constant light intensity from behind.

The device operates as follows: The magnet coil 8 is adapted to project the electron image of the photo-cathode 1 sharply onto the mosaic 5a, i. e., stronger or weaker photo-currents are conducted to the mosaic particles corresponding with the light distribution of 1. Owing to these photo-currents the particles of the mosaic are negatively the more strongly charged in relation to their surroundings, the more powerful the lighting is of the particular point of the intercepting plate 1. There is accordingly formed on 5a an electric image of the light image projected on to photoelectric surface 1. In the course of time these charges are stored more and more, so that the mosaic receives an increasing voltage relative to its surroundings, i. e., an increasingly brilliant charge image. The particles of the mosaic 5a are unable, however, again to rid themselves of their charges until they are illuminated themselves. This illumination takes place by means of the scanning area 13, the light of this area being reproduced sharply on the mosaic by way of 12 and 11 and a scanning spot of light thus passing over the area of the mosaic. If the light intensity of this optical scanning system is selected to be sufficiently great, each particle 5a which is touched by the scanning point will discharge until it has assumed the potential of the anode 6. All particles are accordingly discharged down to the same final potential, i. e., to ground potential, and the impulses resulting from these discharges correspond with the illumination of 1.

A tube of this kind accordingly has in common with the cathode ray scanner the advantage of a clean storage without the requirement of leaking in between successive scans, but, owing to the omission of deflecting and hot cathode units, it is considerably simplified in its construction.

A reversal of the tube shown in Fig. 1 is obtained by projecting the image 3 to be televised onto the mosaic plate 5, whilst the scanning field 13 is projected on to the photo-cathode 1. In this case the mosaic particles are charged positively during the storing period in relation to their surroundings by the loss of photo-electrons, and the electron-optical image point of the point of the photo-cathode 1 excited by the scanning point again discharges the particles in the negative direction. The electrical polarity of the signals is accordingly opposite to that described. The operation otherwise is exactly equivalent to the described hereinbefore operation.

The deflecting mirror 2 may be omitted and inclined angles of incidence may be employed instead. A trapezoidal distortion of the image on 1, which also results in a trapezoidal electronic image on 5, may be compensated by inclined light incidence of the reproduction of the scanning area on 5 which may in this case likewise be effected without a deflecting mirror. Naturally there may also be employed all other methods which have become known in the meantime for eliminating trapezoidal errors. These include the use of the principle of inclined image and object areas in relation to the reproducing lens (compare application Ser. No. 94,128 filed Aug. 4, 1936), the use, as scanning field 13, of a trapezoidal area, for example the sector area of a spiral disc, and the like.

A certain complication in the embodiment as described is to be seen in the requirement of an electron-optical reproduction. An embodiment according to Fig. 2 is exempt from this requirement. In the tube shown in this figure the scanning point and the image to be transmitted are projected simultaneously on to the same mosaic surface 5a, 5b. Opposite to this surface is an anode 6, which may consist, for example, of a wire net arranged in a cross-section which is not sharply reproduced by the lens fields of the tube. An electronic source of any kind, for example a photo-electric layer 1, is provided opposite to the mosaic 5. The light falls through a lens 4 into the tube, forming on the mosaic a sharp reproduction of the image 3 to be transmitted, and at the same time there is reproduced sharply on the mosaic by means of a deflecting mirror or prism 11 disposed in the vicinity of the lens a scanning area consisting of spots of light and located at 13, for example the scanning area of a Nipkow disc. Whereas the pole 5b of the picture receiving plate is connected directly to the amplifier 10 and, by way of a resistance 9, to the ground, the anode 6 is maintained at a positive potential relative to earth, which is suitable for photo-emission and amounts to approximately 100 volts which is provided by the source 7, and the photo-cathode 1 is linked up with a part of this potential. Let it be assumed that the photo-cathode 1 is evenly illuminated during the transmission. This light may be supplied by radiation from the outside. It has been found to be particularly desirable to derive the illumination of 1 optically from the existing light intensity of the mosaic. The emission of 1 resulting from illumination may be adjusted to be so weak that the same between two consecutive scans is just able to reduce the most strongly charged mosaic particles hit by the scanning point, to earth potential. On the other hand the emission of 1 is selected to be so weak that the parts which have been exposed to the brightest points of the image to be transmitted give off more electrons than they receive from 1. The ratio of the two electronic currents should accordingly correspond approximately with the number of image points. Upon expiry of the storing period there is accordingly located on the mosaic 5a a charge image of the light image 3 of such nature that the points which have been exposed to the light have the strongest positive charges, viz., in the extreme case as many volts as the anode battery 7, whilst the dark portions are maintained at earth potential by means of the electron radiation from 1. If now the scanning image point proceeding from 13 passes over this mosaic, the black points experience the strongest jumps in potential, and with a sufficiently powerful illumination by the scanning point they will be brought very near the anode potential 7. The black points accordingly supply strong positive grid potentials to the amplifier 10, whilst the white points undergo merely small increases in potential upon the scanning by means of the image point.

Figure 3:
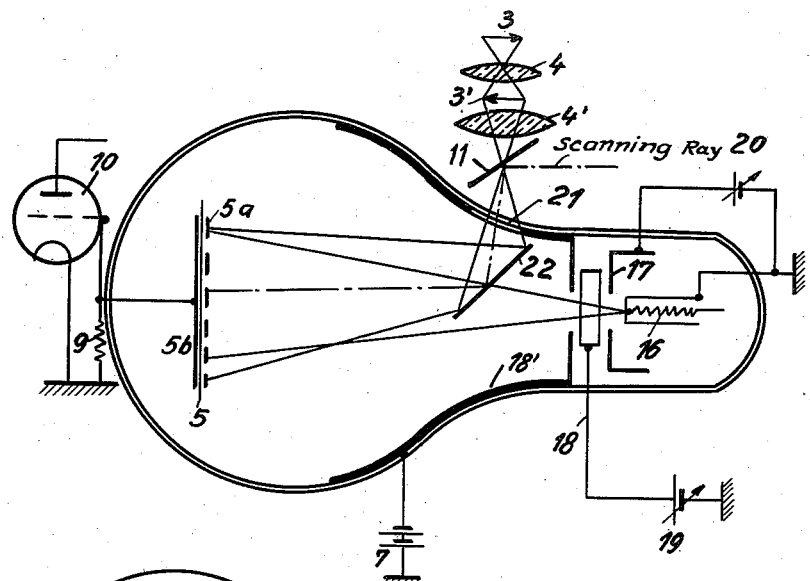

A condition for proper functioning of a tube according to Fig. 2 is a radiation of the discharge electrons, which is as even as possible, on the mosaic. A modification of the described tube having an incandescent cathode is illustrated in Fig. 3, wherein the mosaic 5a receives its discharge electrons from a hot cathode 16. This cathode is situated behind a control grid 17, by means of which the requisite, very small emission may be adjusted, and associated with an electron lens 18. The electron lens 18, consisting in its most simple form of a cylinder 18 and a wall coating 18', is given a short focal distance, which is adjusted by adjustment of the potential of 18 with the battery 19. The wall coating 18' is again provided at a positive potential of a few hundred volts in relation to earth by means of the anode battery 7. The cathode itself is connected with earth, and the control grid 17 is given an adjustable negative potential in relation to the cathode by means of a grid battery 20. There is formed in the manner known from the electron microscope an adjustably enlarged reproduction of the aperture of the control grid or the cathode on the mosaic, having a density of current which is greatly reduced corresponding with the enlargement. If, therefore, there is no illumination of the mosaic, all particles thereof possess the potential of the cathode 16, i. e., of earth. Through aperture 21 and over a small deflecting mirror 22 provided behind the same there may be projected on to the mosaic in the manner of the optical intermediate-image system (compare application Ser. No. 107,669 filed Oct. 26, 1936) a reproduction of the original 3 by means of the lenses 4 and 4', the lens 4' producing a maximum construction of the light bundle, which constriction is formed on the mirror 22 as the image of the front lens 4, said lens 4' further reproducing the intermediate image 3' sharply on the screen 5. Scanning of the mosaic surface 5 may be accomplished by an arrangement similar to that shown by Fig. 2.

Figure 4B:
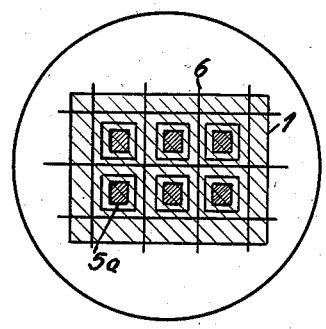
Figs. 4a and 4b show a device according to the invention wherein two photo-electric structures are provided which are so constructed and disposed in relation to each other that no electron-optical means need to be provided between them.
Figure 4A:
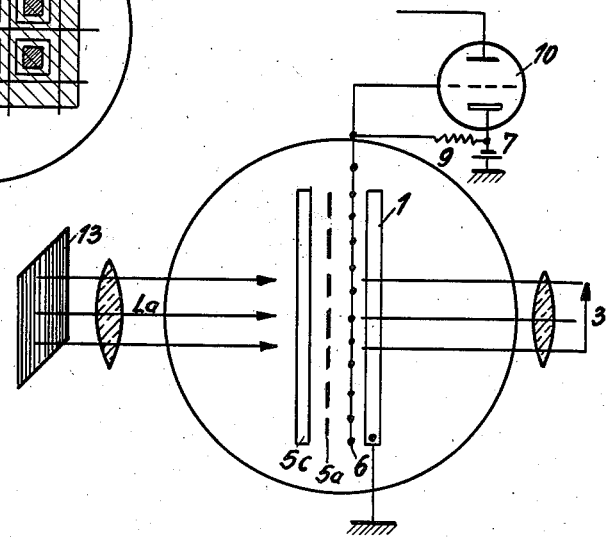

A further form of embodiment of a photoelectric raster device scanned by a light spot is shown in Fig. 4a. A mosaic plate 5a is arranged on a transparent support 5c (e. g. mica) and is situated opposite to two additional electrodes 6 and 1. The electrode 6 is connected over a resistance 9 with the positive pole of a source 7 to act as a suction electrode and is further connected with the grid of the amplifier 10. Behind the suction electrode 6 is situated a second photoelectric layer 1 of a peculiar form.

In Fig. 4b is shown a view through the tube, from which it is apparent that the insulated particles of the mosaic 5a are situated in the openings of "windows" formed by the photo-layer 1. The latter, in a manner of speaking, is the complementary surface of the former, which it is for instance possible to produce by photographing the mosaic area 5a and subsequently photo-activating the silver layer obtained upon the development. The complementary surface 1 thus obtained is accordingly from the electrical point of view a continuous conductive layer, whilst the mosaic area 5a is discontinuous. The suction electrode 6 is arranged in the form of a fine wire grid in the "shaded" intermediate spaces between the two layers. The size of the tube is determined by the fineness and number of the raster elements. Highly satisfactory rasters have been obtained with the use of a dividing machine.

Any other known or suitable process of raster production may however be employed, e. g. a granulating process according to the co-pending patent application Ser. No. 23,845 filed May 5, 1935.

It is obvious that the scanning light of a screen area 13, La in Fig. 4a may be caused to enter from the one side and photo-electrons may thus be obtained from the surface 1, the surface 1 as a whole being preferably grounded. From the other side the optical pattern may be projected on to the mosaic 5a in a straight line of vision by means of a lens, as the insulating supports of 1 and 5 are both transparent. The electric image of 5, formed by positive charges from bright points, is upon the scanning operation applied point by point to earth by the point-like photo-electron current from 1. The fluctuations in potential thus resulting are conveyed to the amplifier by the capacity between 5a and 6.

A particularly simple form of embodiment of a photo-electric raster device scanned by a light spot may be obtained by utilisation of the barrier layer effect (cf. for instance: Simon-Suhrmann "Lichtelektrische Zellen" Berlin, Julius Springer, 1932, p. 47 etc.). In Fig. 5a is shown by way of explanation a cell, the one-half of which operates with high-vacuum emission and the other half with barrier layer emission. A unipolar semi-conductor 23, for example selenium or cuprous oxide, serves as support for the mosaic particles 5a. In barrier layer cells produced by methods known per se, there is formed between the surface of the semi-conductor and the mosaic particles a "blocking layer" which in the direction from the semi-conductor to the particles can be pierced by electrons at the particular spot which is just illuminated. The front wall of 23 is provided with a conductive coating, viz. a thin metal electrode 24. This electrode is connected to the amplifier 10, the grid leak resistance of which is 9. A common anode 6 is situated opposite to the mosaic particles and is maintained about 100 volts positive relatively to 24 by means of the battery 7. The whole system is situated in a vacuum and is, by an optical system 4, illuminated from the right side by light from the image 3, so that an electric image of the original is formed on the mosaic 5a, in which the stored positive residual charges correspond with the electric image bright parts in the image. The scanning area 13 is projected by means of a rearwardly disposed optical system 12, through the semi-transparent metallic electrode 24 on to the barrier layer. In this way electrons are released at the barrier layer touched by the light, which electrons pass to the positively charged mosaic cell through the barrier layer and discharge the same. By this discharge a positive impulse is imparted to the metallic electrode 24 itself, which is proportional to the illumination of the image.

Fig. 5b shows an embodiment of the same principle, in which the "barrier layer effect" is employed twice, viz., both for the storage as well as for the discharge. In this case the mosaic 5a must be so disposed between two semi-conductors 23 and 23′ that it is separated by a barrier layer from each of the two semi-conductors. Whereas the barrier layer 25 must be capable of being passed in the direction of the arrow, i. e., from the semi-conductor towards the mosaic particles 5a, the barrier layer 25′ must allow the passage of electrons in the reverse direction. The back of the semi-conductor 23′ is applied to earth by means of a common, for example annular, metal electrode 26 or is provided with a weak positive bias by the battery 7. The illumination again takes place from the right side by the image 3 and from the left side by the scanning ray from 13. A particle 5a passes electrons through the barrier layer to the anode 26 corresponding with the illumination and in this way becomes positive itself in relation to the semi-transparent metallic electrode 24. The discharge operation is the same as that described in conjunction with Fig. 5a. A cell of this kind does not require to be enclosed within a vacuum.

It it known that the blocking resistances of barrier layer cells cannot be made infinitely large. They are of the order of 1 megohm. In this way undue leakages are liable to occur. According to a further feature of the invention, cells of this nature are made with such a large surface that the capacities between the individual mosaic particles and the tapping electrode approach in their order of magnitude as closely as possible the grid capacity of the amplifier 10 connected thereto. Since the capacity also depends on the spacing, a semi-conductor layer which is as thin as possible is recommended. Owing to the increased capacity the charging potentials available at the end of the storage period are decreased. In this way the effects of the leakages, too, are reduced in comparison with the photo-effects. The coupling with the amplifier, however, is improved in proportion to the capacity of the particles, which means increased effectiveness of scanning and discharge.

According a further feature of the invention, the scale of reproduction in respect of the image to be transmitted and of the scanning area is by the optical systems so adapted to the increased cell area that the number of raster elements per image is not reduced owing to the increase in size of the screen particles. For the production of the cells a mechanical process has been found to be excellently suited, the mosaic 5a being cut into a continuous layer by dividing machines. This method is capable of being performed in practice in view of the coarser structure of the particles.

It may be necessary to insulate against each other not only the particles 5a but also the semiconductor portions 23' adjoining the same and to cause the same to be electrically connected with each other only by the common anode 26. The layer 23' may then be regarded as the parallel connection of a large number of elementary barrier layer cells, which are insulated against each other on the mosaic coating and are, by way of the anode 26, linked up simultaneously with the same bias 7.

Fig. 6 shows a tube operated on substantially the same lines as the tube according to Fig. 1, the electro-magnetic electron-optical reproduction being, however, replaced by an electro-static one, and further details of a practical construction being given.

In this figure, 1 is the picture receiving plate. A ring 23 acts as an optical condenser for the photo-electrons proceeding from 1 and projects them onto the aperture of the electron lens 24, 25. The refractive power is produced electrostatically in the space between the cone 24 and the anode ring 25. A wall coating or metallic cylinder 6 is raised to the same potential as 25 and acts as an anode. The picture receiving plate 5 consists of a photo-electric front layer 5a and a counter electrode 5b.

In order to set the tube into operation the anode 6 is preferably earthed, and the electrode 5b is also earthed over a resistance 9 and at the same time connected with the grid of an amplifying tube 10. Between the anode 6 and the photo-cathode 1 the maximum voltage is maintained, which may be varied between 200 and 2,000 volts. The tube operates with the best results at approximately 700 volts. The ratio between the potentials of the intermediate electrode and the main anode remains unaffected by the absolute amount of the latter.

The potential of the cone 24 is adjusted by means of a potentiometer 30 to an intermediate potential between 1 and 6, whilst the condensing electrode 23 is made negative in relation to 1 to the extent of approximately 10% of the anode potential. This adjustment at the condensing electrode 23 is very important and affects simultaneously the sharpness at the edges of the picture and the light intensity of the image.

By way of a lens 4' the pattern to be transmitted is reproduced on the photo-layer 1. For this purpose there is employed a deflecting mirror 2, on to which there is projected the point of maximum constriction of the light bundle by the lens 4'. The mirror 2 accordingly merely requires to have a size of approximately 1 cm². As set forth in an earlier application Ser. No. 107,669 filed Oct. 26, 1936, the lens 4' projects on to the picture receiving plate 1 the sharp image of an intermediate image 3', and this in turn is projected through a telescope 4 from the remote object 13.

According to a further feature of the invention, the storage tube is fitted into the transmission car together with the mentioned lenses, possibly with the use of periscopic means, and the object is projected through the telescope 4 or by a periscope on to the intermediate plane 3'. Between the occurrence to be transmitted and the point of transmission there exists accordingly only one connection, viz., the optical connection through the telescope 4. The electrical means accordingly remain concentrated in the transmission car and a simple installation is rendered possible on the electrical side.

The light-spot screen necessary for scanning purposes is projected by way of the lens 12 and the deflecting mirror 11 on to the mosaic 5. As scanning pattern may be employed a Nipkow disc which rotates in the plane 14 and is illuminated with practically parallel light by a light source 28. Naturally 14 may also be the plane of the raster area of a disc having a rim of lenses or a similar mechanical means. Again, the screen of a Braun tube, may be situated at the point 14, an electron-optically produced image point performing the scanning movement. This case is represented in the drawings in broken lines and the Braun tube is designated 29. The optical projections may be inter-changed in relation to the manner set forth, i. e., the moving scanning point may be projected on to the photo-layer 1 and the original to be transmitted may be projected on to the mosaic.

I claim:

1. In a television system wherein a scanning tube comprising a light-responsive mosaic electrode and an auxiliary light-responsive electrode is utilized, the method of signal production comprising continuously projecting an optical image upon the mosaic electrode to develop an electrostatic charge in proportion to the light of the projected optical image, optically scanning the mosaic electrode elements at a predetermined repetition frequency to alter the magnitude of the charge thereon between that due to the optical image and a charge of a predetermined magnitude in one direction between minimum and maximum, continuously flooding the auxiliary light responsive electrode to release photoelectrons therefrom, directing the said photoelectrons toward the mosaic to alter uniformly the magnitude of the mosaic charge in the opposite direction between minimum and maximum and to produce said alteration in the absence of light upon the mosaic within a time period substantially coinciding with the scanning cycle, and producing output signal energy by the scanning of the mosaic.

2. In a television system wherein a scanning tube comprising a light-responsive mosaic electrode and an auxiliary light-responsive electrode is utilized to develop a charge neutralizing electron flow, the method of signal production which includes the steps of substantially continuously projecting an optical image upon the mosaic electrode to develop thereon an electrostatic charge of a magnitude substantially proportional to the light of the projected optical image, optically scanning the mosaic electrode element at a predetermined repetition frequency to change the magnitude of the electrostatic charge thereon between that resulting from illumination by the optical image and a charge value of a predetermined magnitude in one direction between minimum and maximum, continuously flooding the auxiliary light responsive electrode with radiant energy to release photoelectrons therefrom in a diffused path, directing the diffused electrons toward the mosaic to alter uniformly the magnitude of the charge thereon in the opposite direction between the predetermined minimum and maximum values and to produce said alteration in the absence of light upon the mosaic within a time period substantially coinciding with the scanning cycle, and then producing trains of output signal energy representative of the optical image by scanning the mosaic.

3. In a television system wherein a scanning tube comprising a light-responsive mosaic electrode and an auxiliary low velocity electron source is utilized to flood the mosaic with electrons, the method of signal production comprising projecting an optical image upon the mosaic electrode to develop thereon an electrostatic charge of a magnitude proportional to the light of the projected optical image, optically scanning the mosaic electrode elements at a predetermined repetition frequency to alter the magnitude of the charge thereon between that due to the optical image and a charge of a predetermined magnitude in one direction between minimum and maximum, substantially continuously releasing a diffused flow of electrons, directing the diffused electrons toward the mosaic to alter uniformly the magnitude of the mosaic charge in the opposite direction between minimum and maximum and to produce said alteration in charge in the absence of light upon the mosaic within a time period substantially coinciding with the scanning cycle and then producing output signal energy by the scanning of the mosaic.

4. In a television transmitter in combination an electron discharge device comprising a coherent photoelectric screen, a mosaic photoelectric screen, said screens being disposed opposite to each other, and a signal plate backing the insulating support of said mosaic screen, light-optical means comprising mirrors arranged inside of the tube for projecting the image to be transmitted on one of said screens, means for scanning the other of said screens by a moving light ray, and a magnetic electron optical reproducing lens for projecting the emission of one of said screens on the other of said screens, said signal plate of said mosaic screen being coupled to an amplifier.

5. In a television transmitter an electron discharge device comprising a fine wire net anode and two transparent photo-electric screens, said screens being disposed in close proximity at different sides of said anode, both screens facing said anode with their sensitive sides, one of said screens being coherent and the other one of mosaic structure, light optical means for projecting the image to be transmitted on said mosaic screen through said coherent screen, means to scan said coherent screen by a moving light ray through apertures surrounding each element of said mosaic screen, and means for coupling said anode to an amplifier.

6. In a television transmitter an electron discharge device comprising a coherent semi-conductor backed by a transparent signal plate and a mosaic photo-electric structure covering said semi-conductor on its side facing away from said signal plates, the elements of said mosaic structure as well as said semi-conductor being so constructed as to form a multitude of elementary barrier layers corresponding in number to the number of mosaic elements, light optical means for projecting the image to be transmitted on said mosaic structure, means for scanning said semi-conductor through said signal plate by a moving light ray, and an anode, said anode being so constructed and so disposed as to allow the passage of light rays.

7. In a television transmitter an electron discharge device comprising a double sided photoelectric mosaic structure, said structure comprising a multitude of minute double barrier layers, the elements of said multitude being separate from each other, each element of said multitude consisting of a highly conductive particle covered on opposite sides with semi-conductive material, a transparent signal plate covering one side of said mosaic structure, an anode covering the other side of said mosaic structure and being so constructed as to allow the passage of light rays, light optical means for projecting the image to be transmitted on the one side of said mosaic structure and means for scanning the other side of said mosaic structure by a moving light ray.

8. In a television transmitter comprising an electron discharge device in which the image to be transmitted is projected on a photo-electric screen and the scanning is perfected by means of a moving light ray, said device consisting of a tube in which a coherent photo-electric screen and a mosaic photo-electric screen are disposed opposite to each other, means for projecting by way of deflecting mirrors arranged inside of the tube the image to be transmitted on one of said screens and to scan the other of said screens by a moving light ray, and electrostatic means for projecting one of said screens electron-optically on the other of said screens, the image plate of said mosaic screen being coupled to an amplifier.

9. Apparatus as claimed in claim 8, wherein the electron-optical means comprise a funnel-shaped metal electrode facing the surface to be reproduced with its smaller opening and a flat apertured electrode opposed to the larger opening of said funnel-shaped electrode, said funnel-shaped electrode having means associated thereto for adjusting its potential to a suitable value intermediate of cathode and anode potential.

10. Apparatus as claimed in claim 8, wherein the electron-optical means comprise a funnel-shaped metal electrode facing the surface to be reproduced with its smaller opening and a flat apertured electrode opposed to the larger opening of said funnel-shaped electrode, said funnel-shaped electrode having means associated thereto for adjusting its potential to a suitable value intermediate of cathode and anode potential, and wherein means are provided to supply said flat apertured electrode with anode potential to cause it to act as a main anode, said flat apertured electrode being provided with an extension in the form of a conductive wall coating extending in the direction in which electron-optical reproduction is effected.

11. Apparatus as claimed in claim 8, comprising, for the purpose of electron-optically reproducing comparatively large surfaces, a ring-shaped member bearing against the wall of the tube, said ring-shaped member having means associated thereto for maintaining it negative in relation to said structure, for producing a concentrating field between the surface to be electron-optically reproduced and the aperture of the next adjacent one of said annular electrodes, the diameter of said ring-shaped electrode exceeding the diameter of the image produced on said structure by at least twice the amount.

KURT SCHLESINGER.